Nov. 1, 1932.  R. J. EMMERT  1,885,596
ELECTRICAL APPARATUS
Filed Oct. 13, 1930
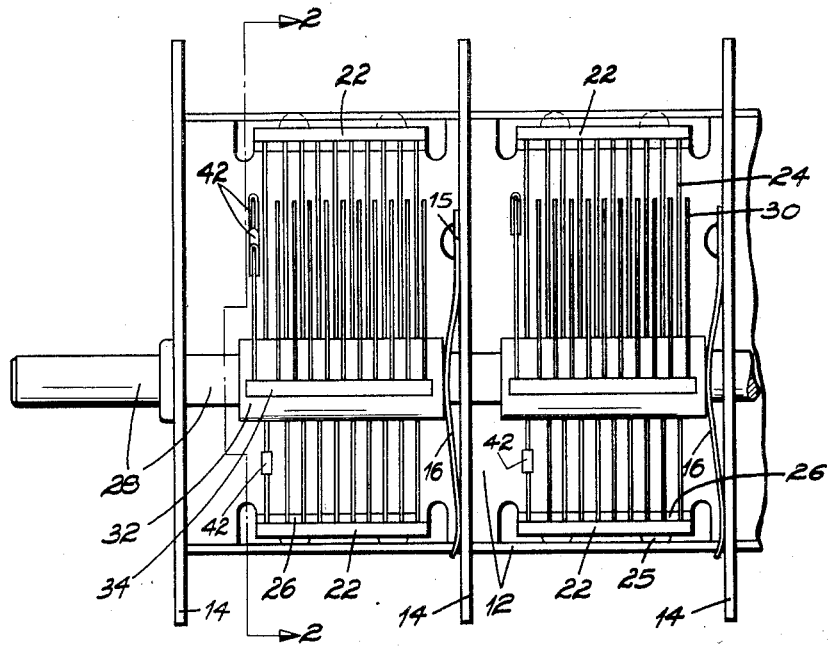
Fig. 1.
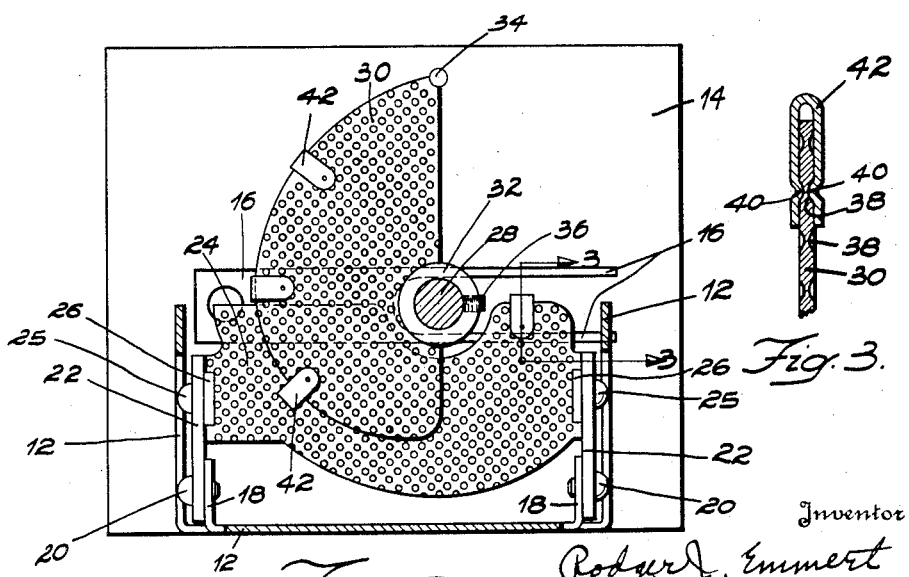
Fig. 2.
Fig. 3.
Inventor
Rodger J. Emmert
By Spencer, Hardman & Fehr
His Attorneys Patented Nov. 1, 1932

1,885,596

UNITED STATES PATENT OFFICE

RODGER J. EMMERT, OF DAYTON, OHIO, ASSIGNOR TO GENERAL MOTORS RADIO CORPORATION, OF DAYTON, OHIO, A CORPORATION OF OHIO

ELECTRICAL APPARATUS

Application filed October 13, 1930. Serial No. 488,347.

This invention relates to an electric condenser and more particularly to the adjusting of the several units in the gang so as to make the units track.

An object of this invention is to provide adjusting means for changing the capacity of one unit without changing the capacity of the other unit or units so as to cause the capacity of the condensers to follow predetermined curves as the unit is set anywhere throughout its range. This has been accomplished by providing stator plates or movable plates or both with metallic clips adjustably mounted thereon near the periphery so that as these metallic clips are shifted on the plate the effective area between the movable plates and the stationary plates is changed thereby changing the capacity of the condenser.

Further objects and advantages of the present invention will be apparent from the following description, reference being had to the accompanying drawing wherein a preferred embodiment of one form of the present invention is clearly shown.

In the drawing:

Fig. 1 represents a plan view of a gang condenser,

Fig. 2, a sectional view, taken on the line 2—2 of Fig. 1,

Fig. 3, a sectional view, drawn to a larger scale and taken on the line 3—3 of Fig. 2.

Referring to the drawing the numeral 12 designates a cradle of conductive material, secured to a radio chassis (not shown) by screws or any other suitable fasteners. The cradle 12 supports a plurality of shield plates or walls 14 of conductive material in any suitable manner; the shield plates 14 have rigidly and conductively mounted thereon in any suitable manner as at 15 a wiping contact 16 which is adapted to always be in contact with the movable plates of the condensers.

It is obvious by now that when the cradle 12 is grounded, the plates of the rotors are also grounded by said conducting members.

The cradle 12 has also secured to each lug or flap 18 by the rivets 20 or any other fasteners a pair of insulating supports 22 that support the stationary or stator plates 24 by having the stator supporting members 26 secured to the insulating supports 22 by screws 25 or the like.

It is also obvious that with this arrangement, the stator is not in contact with the grounded cradle 12.

An indirectly manual operated shaft 28, which projects through all the shield plates 14 is received by two ball bearings, (not shown) provided by the first and last shield plate and which also takes up the thrust in either direction.

The rotor plates 30 are clamped into equally spaced grooves, provided by a plurality of tubular conductive sleeves 32 by forming the sleeve material between successive rotor plates 30 or in any other suitable manner. The outermost periphery of the rotor plates 30 is held in spaced and fixed position by spacing members 34. The tubular sleeves 32 with the rotor plates 30 are adjustably mounted upon the shaft 28 by set screws 36 or by any other adjusting means.

As a conventional gang condenser has been described this far any other type of condenser or parts thereof could be used instead of the above described within the scope of the invention.

In the manufacture of condensers it is found exteremely difficult to secure several condenser units mounted on a common shaft that are sufficiently uniform so as to tune a plurality of equivalent circuits to the same resonant frequency. Therefore, it oftentimes is expedient to provide means for adjusting the capacity of the several units independently.

For this purpose the rotor and stator plates are provided with recesses 38 which are adapted to receive projecting points 40 of a metallic clip 42, wherever the adjustment by such a clip 42 is necessary. By properly locating the clips the effective area or the effective area and the distance between two plates is changed so as to change the capacity of the unit. It is then an easy matter to cause the capacity throughout the range of the condenser to follow a predetermined curve.

These clips are principally used for the first adjustment after assembly of the gang condenser, but can of course, be used at any time after this first adjustment in case it is found desirable to do so.

While the form of embodiment of the present invention as herein disclosed, constitutes a preferred form, it is to be understood that other forms might be adopted, all coming within the scope of the claims which follow.

What is claimed is as follows.

1. An electrical condenser including a pair of condenser plates and means for adjusting the capacity of said condenser comprising a metallic clip adjustably mounted on one of said condenser plates for changing the capacity of the condenser.

2. In an electrical condenser, a plurality of separate condenser units, said units including relatively movable plates, means for simultaneously adjusting the units, and means for adjusting the capacities of the several units to cause simultaneous adjustments to result in equal increments of change of capacities of the units, said second means including a metallic clip adjustably mounted on one of the plates so that the capacity of the units may be equalized by adjusting said clip.

3. In an electrical condenser, a plurality of separte condenser units, each of said units including stator plates and movable plates, means for adjusting the units in unison and means for adjusting the capacity of the several units to a predetermined capacity for particular settings, said second means including a metallic clip attached to the periphery of one of the plates so as to change the capacity by affecting a change in the area of the plates.

4. An electrical condenser comprising a plurality of adjustable condenser units, each of said units including movable plates and stator plates, means for adjusting the condensers in unison and means for adjusting the capacities of the units separately so that as the condensers are adjusted the capacities of the several units vary according to predetermined capacity curves, said second means including a metalic clip adjustably attached to the periphery of one said plates whereby the effective area of the plate is changed so as to change the capacity of the unit.

5. In an electrical condenser a plurality of separate condenser units, each of said units including movable plates and stator plates, means for simultaneously adjusting the units, and means for adjusting the capacities of the several units to cause simultaneous adjustments to result in equal increments of change of capacities of the units, said second means including a metallic clip adjustably attached to one of said movable plates.

6. In an electrical condenser, a plurality of separate condenser units including movable plates and stator plates, means for simultaneously adjusting the units, and means for adjusting the capacities of the several units to cause simultaneous adjustments to result in equal increments of change of capacities of the units, said second means including a metallic clip adjustably attached to the stator plate that may be adjusted to affect a change in the affected area thereby changing the capacity.

7. In an electrical condenser, a plurality of separate condenser units including movable plates and stator plates, means for simultaneously adjusting the units, and means for adjusting the capacities of the several units separately to cause simultaneous adjustments to result in equal increments of change of capacities of the units, said second means including a metallic clip adjustably mounted on the stator plate so that the capacity of each of the units may be adjusted by adjusting the metallic clips.

8. In an electrical condenser, a plurality of separate condenser units including movable plates and stator plates, means for adjusting the units in unison, and means for adjusting the capacities of the several units to predetermined capacities, said second means including a metallic clip attached to the periphery of one of the movable plates, the change in capacity being accomplished by adjusting the clip so as to change the effective area.

9. In an electrical condenser, a plurality of separate condenser units including movable plates and stator plates, means for adjusting the units in unison, and means for adjusting the capacities of the several units separately to predetermined capacities, said second means including metallic clips adjustably attached to the stator plates, the change in capacity being accomplished by adjusting the clips so as to change the effective area.

10. In an electrical condenser, a plurality of separate condenser units including movable plates and stator plates, means for adjusting the units in unison, and means for separately adjusting the capacities of the several units to predetermined capacities, said second means including metallic clips adjustably mounted on the movable plates and metallic clips adjustably mounted on the stator plates so that the change in capacity is accomplished by changing the area by adjusting the clips.

11. An electrical condenser comprising a plurality of adjustable condenser units including movable plates and stator plates, means for adjusting the condensers and means for adjusting the capacities of the several units so that as the condensers are adjusted the capacities of the several units vary according to predetermined capacity curves, said second means including adjustable clips attached to the movable plates so that the effective area between the plates may be changed by adjusting the clips so that the capacity of the units is thereby changed.

12. An electrical condenser comprising a plurality of adjustable condenser units including movable plates and stator plates, means for adjusting the condensers, and means for separately adjusting the capacities of the several units so that as the condensers are adjusted the capacities of the several units vary according to predetermined capacity curves, said second means including metallic clips adjustably attached to one of the stator plates so that as the effective area between the plates is changed by adjusting the clip, the capacity of the units is thereby changed.

13. An electrical condenser comprising a plurality of adjustable condenser units including movable plates and stator plates, means for adjusting the condensers and means for separately adjusting the capacities of the several units so that as the condensers are adjusted the capacities of the several units vary according to predetermined capacity curves, said second means including clips attached to the movable plates and clips attached to the stator plates so that the effective area between the plates may be changed by adjusting the clips thereby changing the capacity of the unit.

In testimony whereof I hereto affix my signature.

RODGER J. EMMERT.